(12) United States Patent
Petrou et al.

(10) Patent No.: US 8,891,907 B2
(45) Date of Patent: Nov. 18, 2014

(54) SYSTEM AND METHOD OF IDENTIFYING VISUAL OBJECTS

(71) Applicant: Google Inc., Mountain View, CA (US)

(72) Inventors: David Petrou, Brooklyn, NY (US);
Matthew Bridges, New Providence, NJ (US); Shailesh Nalawadi, Morgan Hill, CA (US); Hartwig Adam, Marina del Rey, CA (US); Matthew R. Casey, San Francisco, CA (US); Hartmut Neven, Malibu, CA (US); Andrew Harp, New York, NY (US)

(73) Assignee: Google Inc., Mountain View, CA (US)

( * ) Notice: Subject to any disclaimer, the term of this patent is extended or adjusted under 35 U.S.C. 154(b) by 168 days.

(21) Appl. No.: 13/693,665

(22) Filed: Dec. 4, 2012

(65) Prior Publication Data

US 2013/0188886 A1    Jul. 25, 2013

Related U.S. Application Data

(60) Provisional application No. 61/567,611, filed on Dec. 6, 2011.

(51) Int. Cl.
| | |
|---|---|
| *G06K 9/54* | (2006.01) |
| *G06F 17/30* | (2006.01) |
| *G06K 9/46* | (2006.01) |
| *H04N 5/225* | (2006.01) |
| *G06K 9/32* | (2006.01) |
| *G06K 9/00* | (2006.01) |
| *G06K 9/22* | (2006.01) |
| *G06K 9/62* | (2006.01) |
| *G06K 9/78* | (2006.01) |
| *G06F 3/048* | (2013.01) |

(52) U.S. Cl.
CPC ........ *G06F 17/30244* (2013.01); *G06K 9/4652* (2013.01); *H04N 5/225* (2013.01); *G06K 9/3258* (2013.01); *G06K 9/00993* (2013.01); *G06K 9/228* (2013.01); *G06K 9/6271* (2013.01); *G06K 9/00671* (2013.01); *G06K 9/78* (2013.01); *G06F 3/048* (2013.01)
USPC ........................................................ 382/305

(58) Field of Classification Search
USPC ........................................ 382/181, 219, 305
See application file for complete search history.

(56) References Cited

U.S. PATENT DOCUMENTS

| | | | |
|---|---|---|---|
| 7,031,554 | B2 | 4/2006 | Iwane |
| 2009/0102859 | A1 | 4/2009 | Athsani et al. |

(Continued)

FOREIGN PATENT DOCUMENTS

KR        20060004678 A       1/2006

OTHER PUBLICATIONS

"Continuous Mode in Goggles—Google Mobile Help", [online]. Retrieved from the Internet: <support.google.com/mobile/bin/answer>, Mar. 20, 2012, 1 page.

(Continued)

*Primary Examiner* — Duy M Dang
(74) *Attorney, Agent, or Firm* — Fish & Richardson P.C.

(57) ABSTRACT

A system and method of identifying objects is provided. In one aspect, the system and method includes a hand-held device with a display, camera and processor. As the camera captures images and displays them on the display, the processor compares the information retrieved in connection with one image with information retrieved in connection with subsequent images. The processor uses the result of such comparison to determine the object that is likely to be of greatest interest to the user. The display simultaneously displays the images the images as they are captured, the location of the object in an image, and information retrieved for the object.

20 Claims, 15 Drawing Sheets

(56) References Cited

U.S. PATENT DOCUMENTS

2009/0245573 A1    10/2009    Saptharishi et al.
2011/0125735 A1    5/2011    Petrou

OTHER PUBLICATIONS

"Data Usage in Continuous Mode—Google Mobile Help", [online]. Retrieved from the Internet: <support.google.com/mobile/bin/answer>, Mar. 20, 2012, 1 page.

"Enable Goggles Search History—Google Mobile Help", [online]. Retrieved from the Internet: <support.google.com/mobile/bin/answer>, Mar. 20, 2012, 1 page.

"Enable Search From Camera—Google Mobile Help" [online]. Retrieved from the Internet: <support.google.com/mobile/bin/answer>, Mar. 20, 2012, 1 page.

"Google Goggles", [online]. Retrieved from the Internet: <www.google.com/mobile/goggles>, Mar. 20, 2012, 1 pages.

"Improving Search Results—Google Mobile Help", [online]. Retrieved from the Internet: <support.google.com/mobile/bin/answer>, Mar. 20, 2012, 2 pages.

"Learn More About Goggles Search History and Continuous Mode—Google Mobile Help", [online]. Retrieved from the Internet: <support.google.com/mobile/bin/answer>, Mar. 20, 2012, 1 page.

"Overview—Google Mobile Help", [online]. Retrieved from the Internet: <support.google.com/mobile/bin/answer>, Mar. 20, 2012, 2 pages.

"Release Notes—Google Mobile Help" [online]. Retrieved from the Internet: <support.google.com/mobile/bin/answer>, Mar. 20, 2012, 2 pages.

"Remove or Disable Goggles Search History—Google Mobile Help" [online]. Retrieved from the internet: <support.google.com/mobile/bin/answer>, Mar. 20, 2012, 1 page.

"Requirements for Using Goggles—Google Mobile Help", [online]. Retrieved from the Internet: <support.google.com/mobile/bin/answer>, Mar. 20, 2012, 1 page.

"Search Results Page—Google Mobile Help" [online]. Retrieved from the internet: <support.google.com/mobile/bin/answer>, Mar. 20, 2012, 1 page.

"Sharing Goggles Results—Google Mobile Help" [online]. Retrieved from the internet: <support.google.com/mobile/bin/answer>, Mar. 20, 2012, 1 page.

"Translate Text With Goggles—Google Mobile Help" [online]. Retrieved from the internet: <support.google.com/mobile/bin/answer>, Mar. 20, 2012, 2 pages.

"User Generated Content in Goggles 1.7—Google Mobile Help" [online]. Retrieved from the internet: <support.google.com/mobile/bin/answer>, Mar. 20, 2012, 2 pages.

"View Goggles Search History" [online]. Retrieved from the internet: <support.google.com/mobile/bin/answer>, Mar. 20, 2012, 1 page.

International Search Report & Written Opinion for Application No. PCT/US2012/067929 dated Mar. 13, 2013.

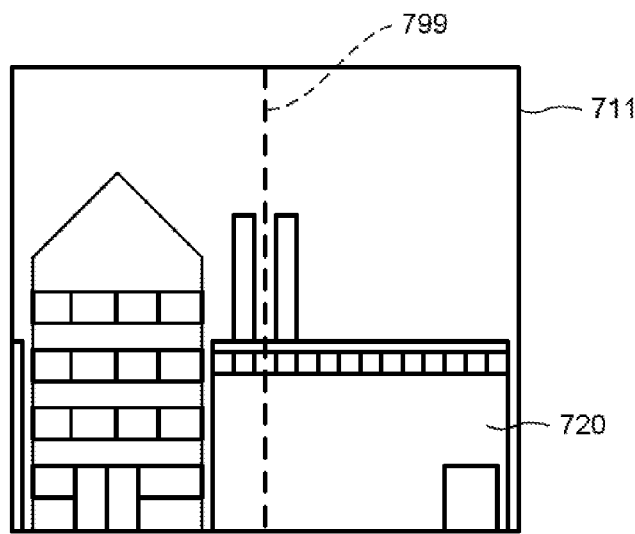
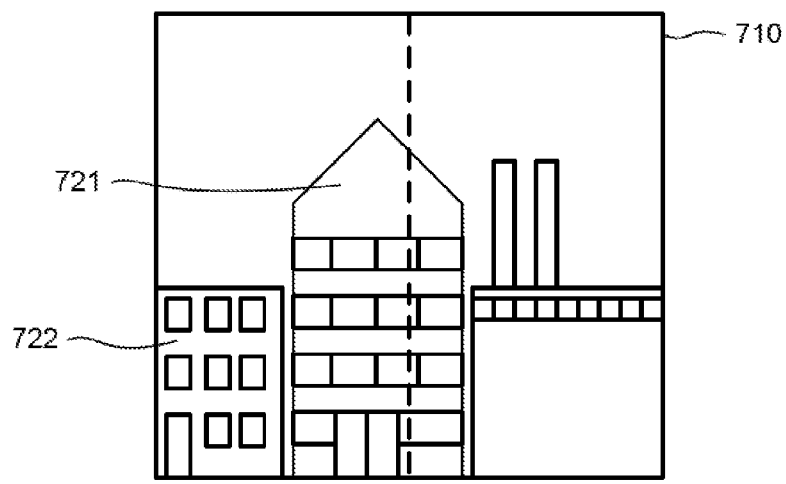
FIGURE 7

| Description | Frequency |
|---|---|
| Bleach Bottle (Shape) | 3 |
| Brand OR (Logo) | 2 |
| Brand OR Bleach 64 oz (Bar Code) | 2 |
| Brand QR (Text) | 1 |
| Brand OP (Text) | 1 |
| AA (Text) | 1 |
| AA Brand (Logo) | 1 |

1011

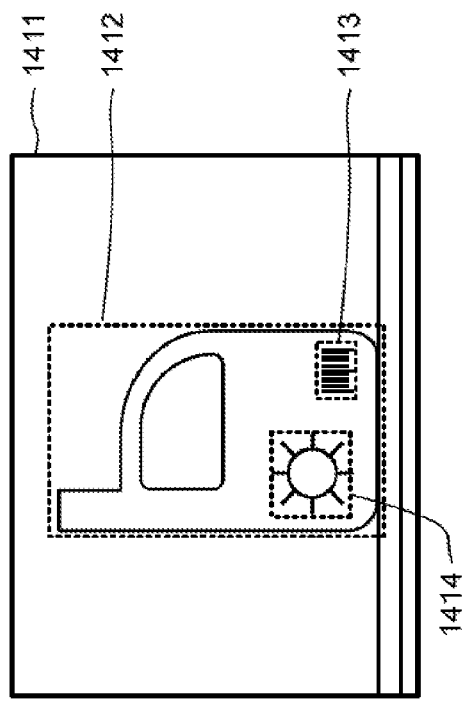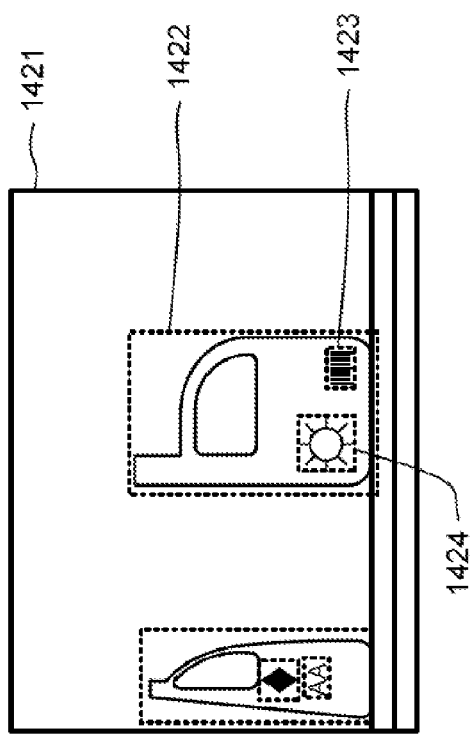
FIGURE 14

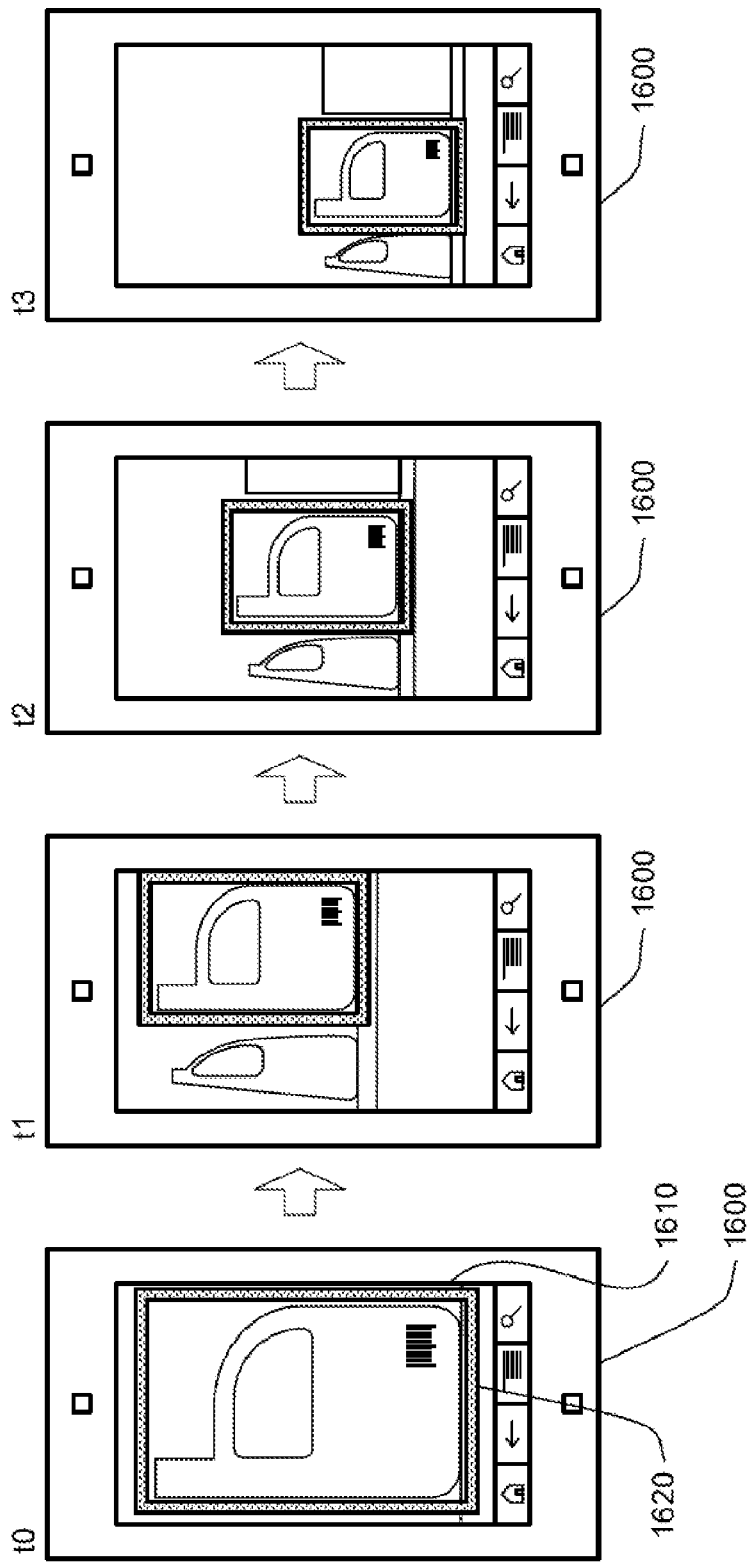

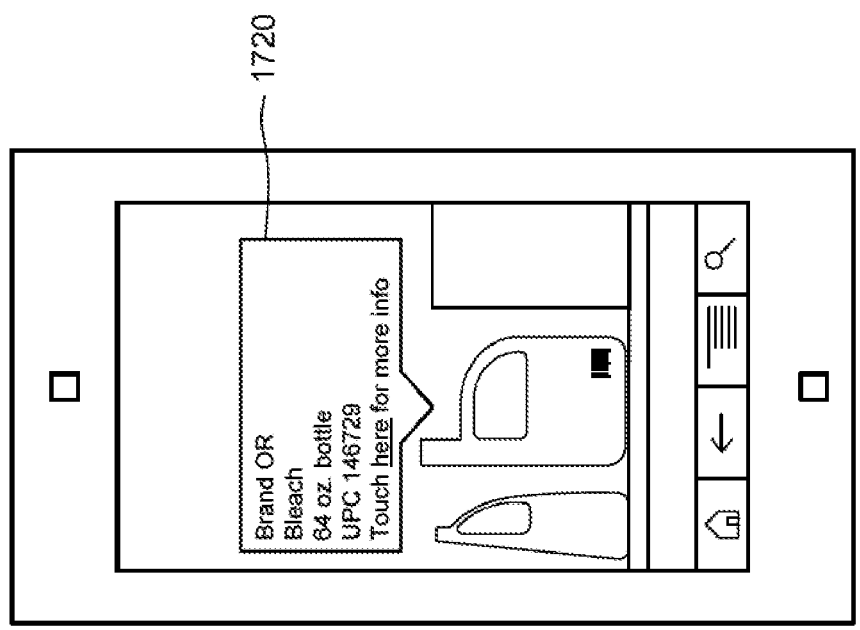

SYSTEM AND METHOD OF IDENTIFYING VISUAL OBJECTS

CROSS-REFERENCE TO RELATED APPLICATIONS

The present application claims the benefit of the filing date of U.S. Provisional Patent Application No. 61/567,611 filed Dec. 6, 2011, the disclosure of which is hereby incorporated herein by reference.

BACKGROUND

Augmented reality applications permit a user to view a scene that is interlaced with information about the scene. By way of example, as a user manipulates a video camera, an augmented reality application may analyze some of the visual characteristics in the captured scene. If the application is able to obtain more information about an object in the scene based on the visual characteristics, additional information about the object may be displayed on a screen connected to the camera when the video is shown to the user.

A functionality that permits a user to take a picture of a scene and attempts to recognize one or more objects in the scene may be provided. The objects may be quite diverse, e.g., the functionality may compare pictures of buildings to known landmarks, determine the value of bar codes such as a Universal Product Code (UPC), and use optical character recognition (OCR) to extract text from a photo. If an object is recognized, an attempt may be made to obtain additional information about the object where such information exists external to the image data. That additional information may then be displayed to the user or provided to a search engine to identify one or more search results to be shown to the user.

SUMMARY

In one aspect, the system and method may include a camera-enabled mobile device, such as a cell phone, that can capture images with a frequency that is sufficient to make the objects in the images appear to be moving when the images are shown to a human in sequence at a rate that may be the same, greater or less than the rate at which the images were captured. Some or all of the captured images may then be sent wirelessly by the mobile device to a server for further analysis.

The system and method may attempt to identify and obtain more information about objects in the captured sequence of images that are likely to be of interest to the user. If the server is successful in doing so, the server may transmit the additional information to the mobile device. The additional information may include information that is inherent to the item captured in the image such as the product's size if the item is a product. The additional information may be related but not necessarily inherent to the product, such as a search result that is obtained by querying a web search engine with the name of the object. The server may use various methods to determine the object within a captured image that is likely to be of greatest interest to the user. One method may include determining the number of images in which an individual object appears. The server may also determine how often related additional information found for one image matches related additional information found for other images. The server may send the additional information to the mobile device.

The device may display a variety of data associated with the objects in the image. For example, the server may provide the mobile device with the location, within each image the server analyzes, of the object to which the additional information pertains. In response, the device may simultaneously display two or more of the following: (a) the image sent to the server, (b) an image visually similar to the image sent to the server, such as a subsequent frame of a video stream, (c) an annotation that includes the additional information provided by the server, and (d) a visual indication within the image that is located on or proximate to the object for the purpose of identifying the object to which the additional information pertains.

The location of the visual indication may change as the location of the object changes from image to image. For instance, the device may display a bounding box around the object that moves as the object or camera moves. The location of the bounding box may be determined for subsequent images by using optical flow algorithms to determine the change in the bounded object's location between images. The device may perform the optical flow analysis and display the second image with the bounding box even if the server has not yet provided the device with any information relating to the second image.

The system and method may sequentially display the images and additional information at a speed that, from a human perception point of view, corresponds with the scene being captured by the camera at the time of display. In other words, the system and method may be structured so as to minimize the lag between the capture of an image and the display of the annotated image.

In another aspect, the system and method determines whether an object in one image and an object in another image are visual characteristics of the same item or relate to different items. Two items may be considered different items if they occupy different locations in the three-dimensional space of the captured scene. By way of example, the processor may determine that different objects in different images relate to the same item if the additional information retrieved for the different objects is the same or indicates that the objects may be related to the same item. The processor may also determine that objects in different images relate to the same item if the objects are visually similar and their locations would overlap if one image was superimposed over the other. A processor may also use such overlap to select the additional information. For instance, if one object in one image overlaps with another object in another image, and if the types of additional information retrieved for the objects are the same but the values of that information are different, the processor may apply the values of one object to the other object.

The system and method may use the presence of the same item in multiple images as a factor when selecting the additional information. For instance, when the processor uses the additional information determined from objects in the images as a query to search for even more information, the query may apply greater or lesser weight to the additional information dependent on whether the additional information relates to the same item.

Yet further, the system and method may aggregate information from different images for a variety of purposes. In one regard, the processor may determine whether objects that are unrecognizable in a first image correspond with an object that is recognizable in a second image. By way of example, some portions of an object may be out of focus in one image but in focus in the next image. If so, the processor may associate the recognizable objects in the first image with the recognizable objects in the second image. The association may be used to search for additional information. In another regard, if the processor determines that different recognizable objects in different images are the same type of object, the processor may aggregate the information obtained for the different objects for the purpose of storing the information or searching.

BRIEF DESCRIPTION OF THE DRAWINGS

FIG. 7 illustrates sample images captured by a camera-enabled device.

FIG. 14 illustrates sample images captured by a camera-enabled device.

FIG. 16 illustrates a sequence of sample images displayed on a mobile device.

FIG. 17 illustrates a sample image displayed on a mobile device.

DETAILED DESCRIPTION

In one aspect, a system and method is provided where images are continuously captured by a camera of a mobile device, objects that are most likely to be of interest to the user are identified, and information relating to the identified objects is retrieved from a source other than the captured image data and then displayed on the device. In order to determine the objects of most likely interest to the user, the system and method may analyze objects captured in one image of a video stream and compare them with objects captured in other images of the video stream.

Figure 1:
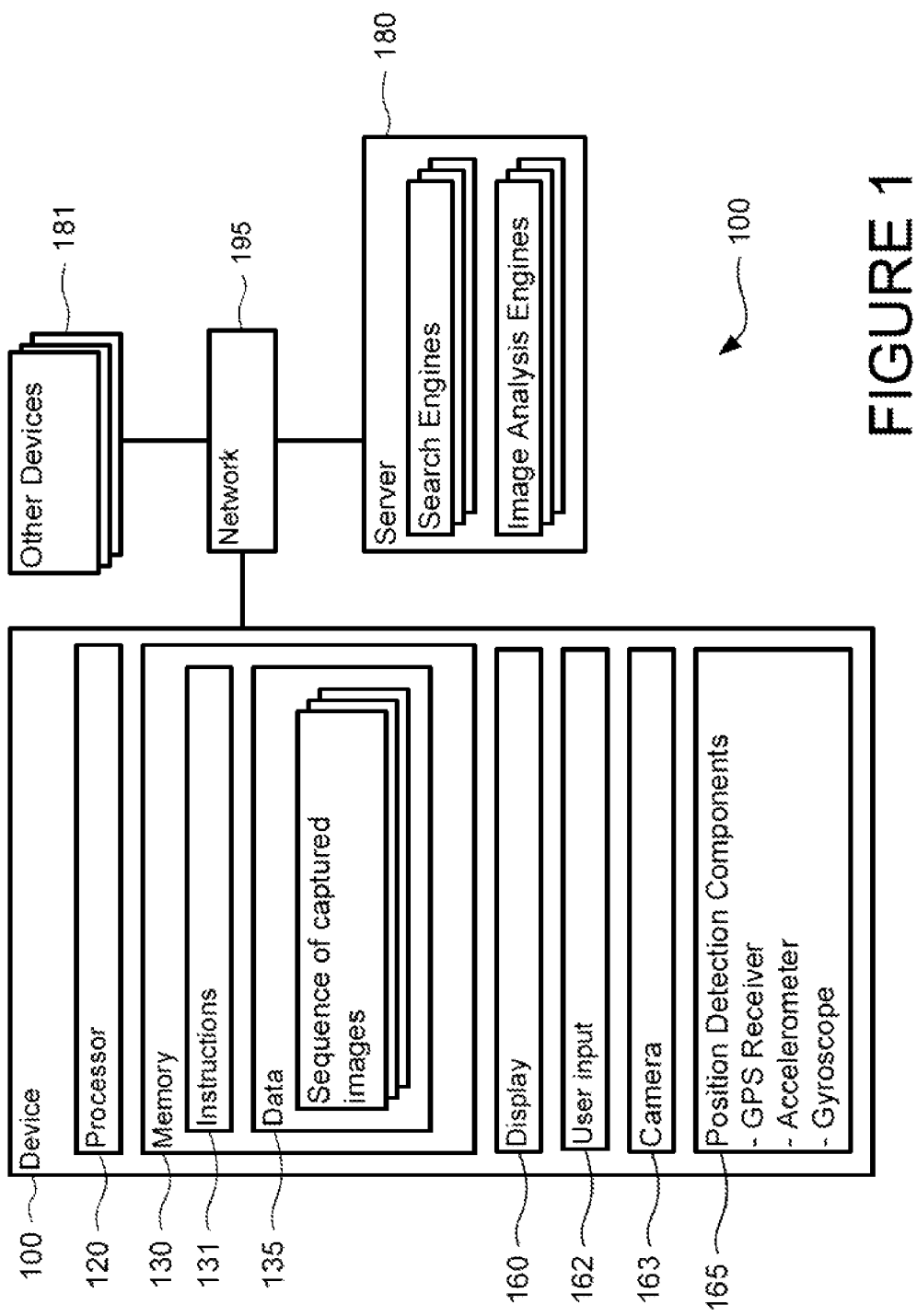
FIG. 1 is a functional diagram of a system.

As shown in FIG. 1, system 100 may include a device, such as but not limited to a computer or cell phone, containing a processor 120, memory 130 and other components typically present in general purpose computers.

The memory 130 stores information accessible by processor 120, including instructions 131 and data 135 that may be executed or otherwise used by the processor 120. The memory 130 may be of any type capable of storing information accessible by the processor, including a computer-readable medium or other medium that stores data that may be read with the aid of an electronic device, such as ROM, RAM, a magnetic or solid-state based hard-drive, a memory card, a DVD or other optical disks, as well as other volatile and non-volatile write-capable and read-only memories. A system may include different combinations of the foregoing, whereby different portions of the instructions and data are stored on different types of media.

The instructions 131 may be any set of instructions to be executed directly such as object code or indirectly such as scripts or collections of independent source code modules interpreted on demand by the processor. For example, the instructions may be stored as computer code on a computer-readable medium. In that regard, the terms "instructions," "programs" and "applications" may be used interchangeably herein. Functions, methods and routines of the instructions are explained in more detail below.

Data 135 may be retrieved, stored or modified by processor 120 in accordance with instructions 131. For instance, although the system and method is not limited by any particular data structure, the data may be stored in computer registers, in a relational database as a table having multiple different fields and records, XML documents or flat files. The data may also be formatted in any computer-readable format. By further way of example only, image data may be stored as bitmaps of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may include any information sufficient to identify the relevant information, such as numbers, descriptive text, proprietary codes, references to data stored in other areas of the same memory or different memories including other network locations, or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements as being within the same block, those of ordinary skill in the art will understand that the processor and memory may actually include multiple processors and memories that may or may not be stored within the same physical housing. For example, rather than being stored in the same computer, processor 120 and memory 130 may be stored in separate devices. Although there may be advantages to locating the processor 120 and memory 130 within the same housing of a single device, various processes may be performed externally to the device and various data may be stored externally of the device. For example, if a processor or memory used or required by the device 100 is externally located, device 100 may obtain the required information wirelessly. A server may display information by transmitting, over a network, the information to device 100 such that the information is shown on a display 160 incorporated in device 100. Accordingly, although references to a processor or memory herein will assume that the processor and memory are stored internally within device 100, such references will be understood to include references to a collection of processors or computers or memories that may or may not operate in parallel and may or may not be located a single housing.

The device 100 may be at one node of a network 195 and capable of directly and indirectly communicating with other nodes of the network such as a server 180 or other devices 181 with use of a communication component. Network 195 and the device's communication with other devices, including computers, connected to the network may include and use various configurations and protocols including cellular networks such as 3GPP Long Term Evolution (LTE), other wireless networks such as WiFi, the Internet, intranets, virtual private networks, local Ethernet networks, private networks using communication protocols proprietary to one or more companies, instant messaging, HTTP and SMTP, and various combinations of the foregoing. Although only a few devices are depicted in FIG. 1, a typical system can include a large number of connected devices.

While not limited to any particular type of product, device 100 may be a cell phone, tablet or portable personal computer intended for use by a person and components normally used in connection with such devices such as an electronic display 160, user input 162, camera 163, speakers, a network interface device and all of the components used for connecting these elements to one another. By way of example, the display may be a small LCD touch-screen, a monitor having a screen, a projector, a television, or any other electrical device that is operable to display information. User input 162 may include a mouse, keyboard, touch screen or microphone. Indeed, devices in accordance with the systems and methods described herein may include any device capable of processing instructions and transmitting data to and from humans including general purpose computers.

Device 100 may further include a component 165 for detecting or estimating the geographic position and orientation of the device. For example, the device may include a GPS receiver to determine an estimate of the device's latitude, longitude and altitude position. The component may also include software for determining the estimated geographic position of the device based on other signals received at the device, such as signals received at a cell phone's antenna from one or more cell phone towers if the device is a cell phone. The position detection component 165 may also include an accelerometer, gyroscope or other component that can detect changes in the devices position or orientation. By way of example only, if the device started at rest, accelerometers may be used to determine the direction in which the device's position was changed and estimate the velocity of the change. Component 165 may also determine the device's pitch, yaw or roll or changes thereto relative to the direction of gravity or a plane perpendicular thereto.

Figure 3:
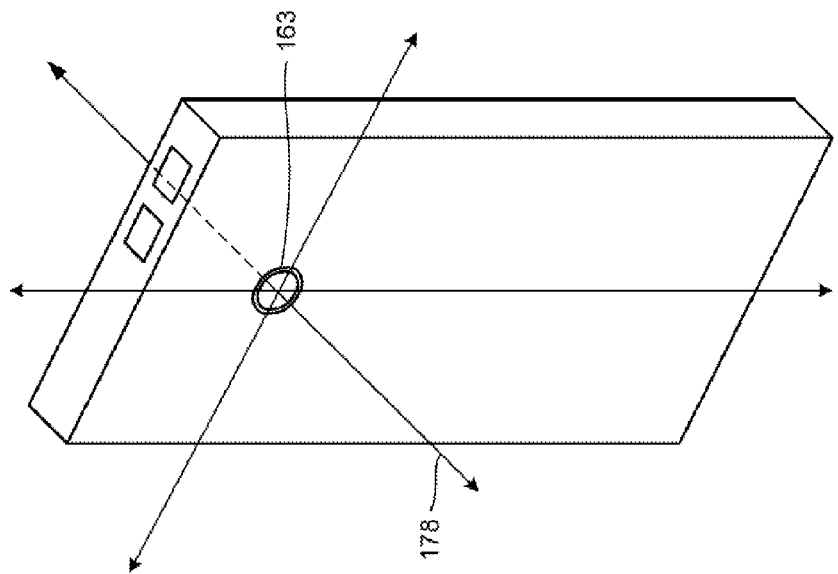
FIG. 3 illustrates the outer appearance of the back of a device in accordance with one aspect of the system and method.
Figure 2:
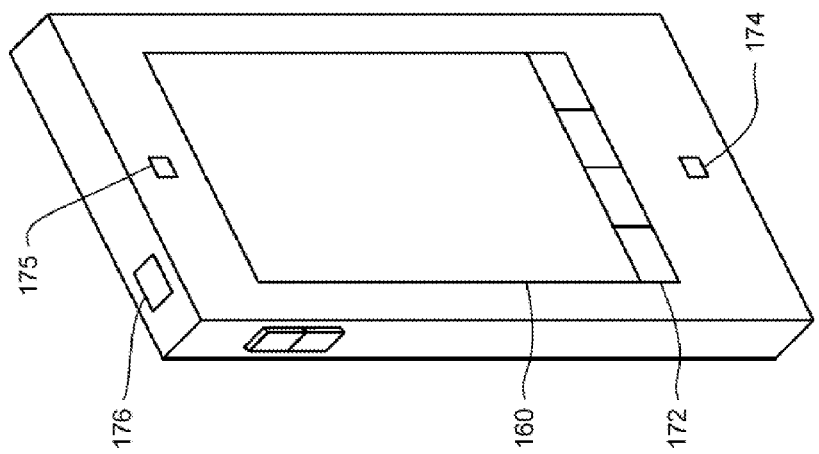
FIG. 2 illustrates the outer appearance of the front of a device in accordance with one aspect of the system and method.

FIGS. 2 and 3 illustrate one possible configuration of a device in accordance with the system and method. The front side of the device may include a touch-screen display 160, buttons 172, speaker 175, microphone 174 and a cell-phone antenna 176. As shown in FIG. 3, camera 163 may be disposed on the back side of the device. The camera angle may be fixed relative to the orientation of the device. In that regard, the device, e.g., the phone and the camera, may change position by moving along one or more of the axes 178 shown in FIG. 3 and may also change its orientation by rotating relative to one or more of the axes.

Operations in accordance with the system and method will now be described. Various operations can be handled in a different order or simultaneously, and each operation may be composed of other operations.

If the user is interested in obtaining more information about objects within the user's line of sight, the user may activate a corresponding program stored on device 100 to be executed by processor 120. Upon such activation, camera 163 may begin taking a sequence of pictures and store the resulting images in memory 130. The user may move the device as images are being captured such as by intentionally panning through the environment or capturing objects from multiple camera angles. The user may also move the device unintentionally. For instance, the movement may result from the jitter that often naturally occurs when a person holds up a device.

In one aspect, the system and method captures images with a frequency that is sufficient to make the objects in the images appear to move when the images are shown to a human in sequence at a rate that may be the same, greater or less than the rate at which the images were captured. The set of images may be frames of a video captured by the device's camera 163. If the device is a cell phone and the camera is a common camera for cell phones, the images may be captured and displayed as frames of a video stream at a rate of 15-30 frames per second or greater.

The system and method may attempt to identify and obtain more information about objects in the image that are likely to be of interest to the user.

The mobile device may send wirelessly some or all of the captured images to a server for further analysis. For example, while some devices may have sufficient processing and data resources to perform all of the analysis and annotation of images, others may not. In that regard, as camera 163 captures images, device 100 may stream those images to image analysis engines managed by server 180.

The system and method may use a variety of methods to select particular frames for transmission. By way of example, the mobile device may transmit a percentage of the captured frames to the server, such as every third frame. The device may also send frames at specific time intervals, such as one frame every second. Combinations of criteria may also be used and varied during run time depending on the type of the device. For instance, some devices may be unable to perform complex image analysis. Variable constraints may also occur such as low bandwidth. The system and method may also select images based on efficiency, such as when the differences in images are sufficiently slight that some images may be skipped. Absolute and dynamic limitations may also be combined, such as sending no more than one frame every second and no less than one frame every three seconds. In some implementations, frames may be sent as fast as useful results can be expected from the server in return.

Various image-data specific parameters may be used to identify particular images to be sent to a server for further analysis. As noted above, if two images are extremely similar, the mobile device may forego sending one of the images. The mobile device may also perform an initial check, such as by using edge detection, to determine if the image is too blurry to expect helpful information from the server. The mobile device may thus determine the best frames to send to the server.

The system and method may also vary the size of the images to be analyzed. The mobile device may initially send the server small versions of frames by decreasing the pixel height and width by down sampling. Smaller versions of the frames may also be generated by decreasing the encoding quality of the captured image, e.g., by using aggressive JPEG compression. After a frame is sent, the system and method may then determine whether to increase or decrease the size of the next frame based on the likelihood that the user is pointing the camera at something interesting to the user.

For instance, the processor may determine whether the locations of the objects within the images are significantly changing from frame to frame. If the locations of the objects are relatively stable, the system and method may assume that the user has settled the camera on a scene that the user wants to learn more about. On the other hand, if the locations of objects are changing rapidly or disappearing altogether, the system and method may assume that the user is currently moving the camera to a scene in which the user is more interested.

In that regard, the mobile device may determine whether the locations of objects from frame to frame are changing slowly or quickly. If the differences between the objects' locations from one frame to the next are relatively small, the processor may increase the size of the frame sent to the server, thus providing the server with more image data to analyze. Similarly, if the differences between the objects' locations from the latest frame to the penultimate frame are smaller than differences between the objects' locations from the penultimate frame to the next earlier frame, the device's movement may be slowing down and the processor may increase the size of images sent to the server. In other words, the device may send a larger version of the latest frame than what it would have sent if the objects were moving faster. Conversely, if the differences between the objects' locations from one frame to the next are relatively large, or if the differences between the objects' locations from the latest frame to the penultimate frame are larger than differences between the objects' locations from the penultimate frame to the next earlier frame, the processor may decrease the size of the frame sent to the server.

The processor may use other criteria to determine the size of the image to send. By way of example, if the bandwidth of its link to the server is restricted, the mobile device may send relatively smaller images.

The system may be configured to detect and recognize a large and great diversity of objects. By way of example, the server may detect and recognize objects as diverse as books, DVDs, landmarks, barcodes, Quick Response (QR) codes, logos, contact information, artwork, stores and other businesses, consumer and other products, text, buildings, or any other entity constituting visual indicia that may be used to obtain additional information that is not contained within the image data.

The system and method may detect objects using a number of different methods and algorithms. For instance, training corpora may be used where each training corpus contains a set of objects. For each object, there may be one or more images containing the visual appearance of that object and some metadata of the object such as type, name, or the like. These images may be used as reference images. For each reference image, descriptors for image interest points may be extracted and an image template built. A descriptor may include one or more of the following types of information: information extracted from local pixels around an interest point, such as a point in the image having a clear definition and being mathematically well-founded; information having a well-defined position in image space; information having a local image structure that is rich in terms of local information contents; and information that is stable under local and global perturbations in the image domain. The template may include the extracted information of the reference image and a set of descriptors of all interest points in the reference image. Matching may be performed based on the image template, such as where the extracted information is more effective than raw image data when computing image similarity. Matching may be performed by a module having knowledge of the set of reference images, e.g., one or more training corpora. When given a query image, the matcher retrieves and outputs reference images that are similar to the query. For each similar reference image, a match score may be provided to measure the similarity, which may be computed based on the number of matched descriptors. The matcher may also output the matched region and descriptors in both reference and query images. The corresponding metadata of the matched reference image may be further output to the user.

The system and method may obtain information about objects found in a single image, including information that may be obtained directly from the image data such as the shape and color of the objects captured in the data. A processor may also obtain data that is stored externally to the image data, such as recognizing that an item in the image is a product and subsequently obtaining information about the product. The additional information may be inherent to the product such as its size or ingredients. The processor may further obtain external data that is related to the item but not necessarily inherent to the item itself, such as by searching a database for products that are similar to the item. By way of example, if the processor determines that the latest image from the camera includes a UPC or QR bar code, the system may decode the bar code and use the decoded value as a query that is provided to a search engine, such as a database that maps bar codes to particular products. The results of the search may then be shown to the user including the product's size, the price charged for the product by the store if the user is in the relevant store, and competitive products and prices.

The system and method may also use data from two or more of the received images to obtain information external to the image data. For example, rather than looking at each image in isolation, a processor may use and compare information from multiple frames to identify the optimum object(s), namely, the object(s) in an image that are likely to be of greatest interest to the user. The processor may further determine the optimum annotation, namely, information that exists outside of the image data but is related to the optimum object(s) and likely to be of the greatest interest to the user relative to other objects in the image.

In one aspect, if a portion of an image is not recognizable, the processor may determine whether the unrecognizable portion is part of an object that was captured in another frame. If so, the processor may associate the recognizable objects or portions thereof in one frame with the recognizable objects or portions thereof in the other frame in order to obtain more information about the totality of objects and their relationship to each other, if any.

Figure 4:
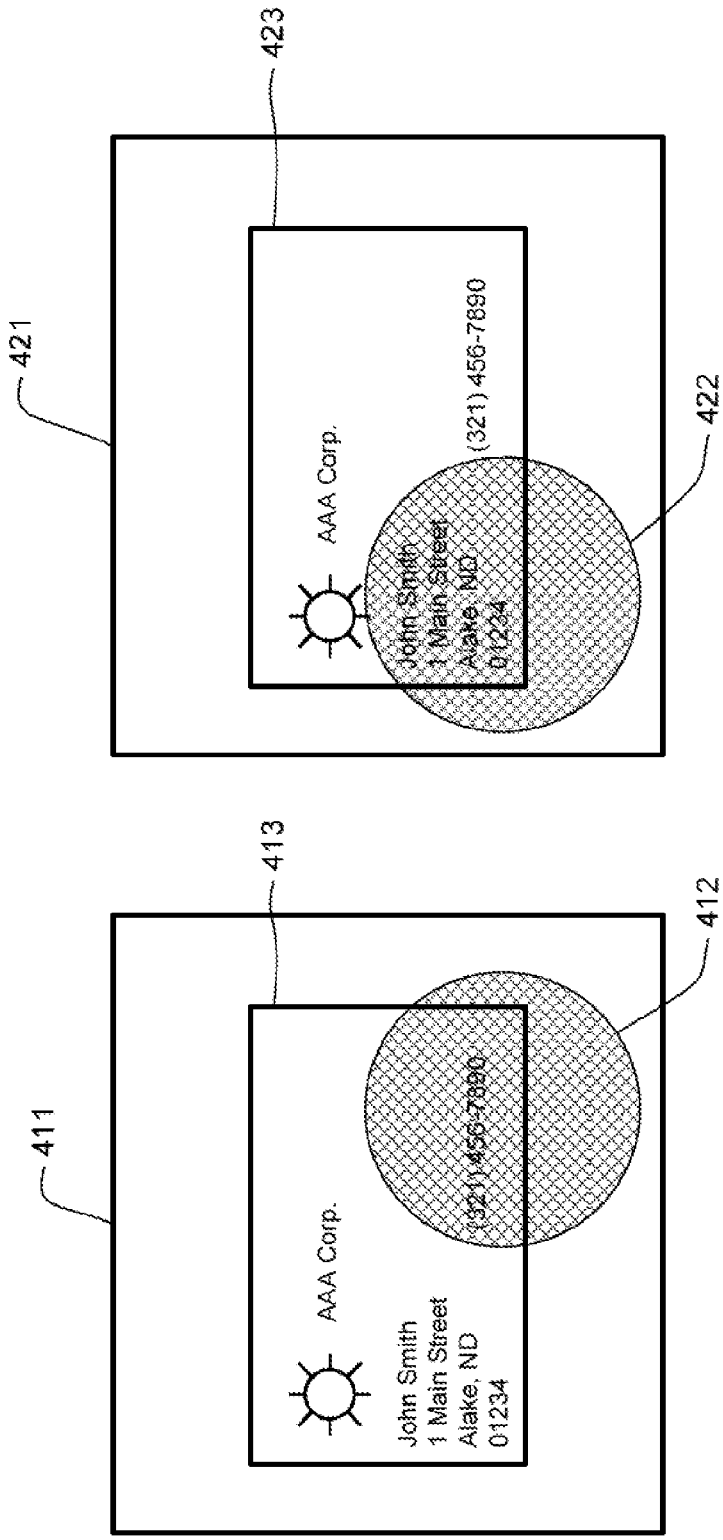
FIG. 4 illustrates sample images captured by a camera-enabled device.
Figure 5:
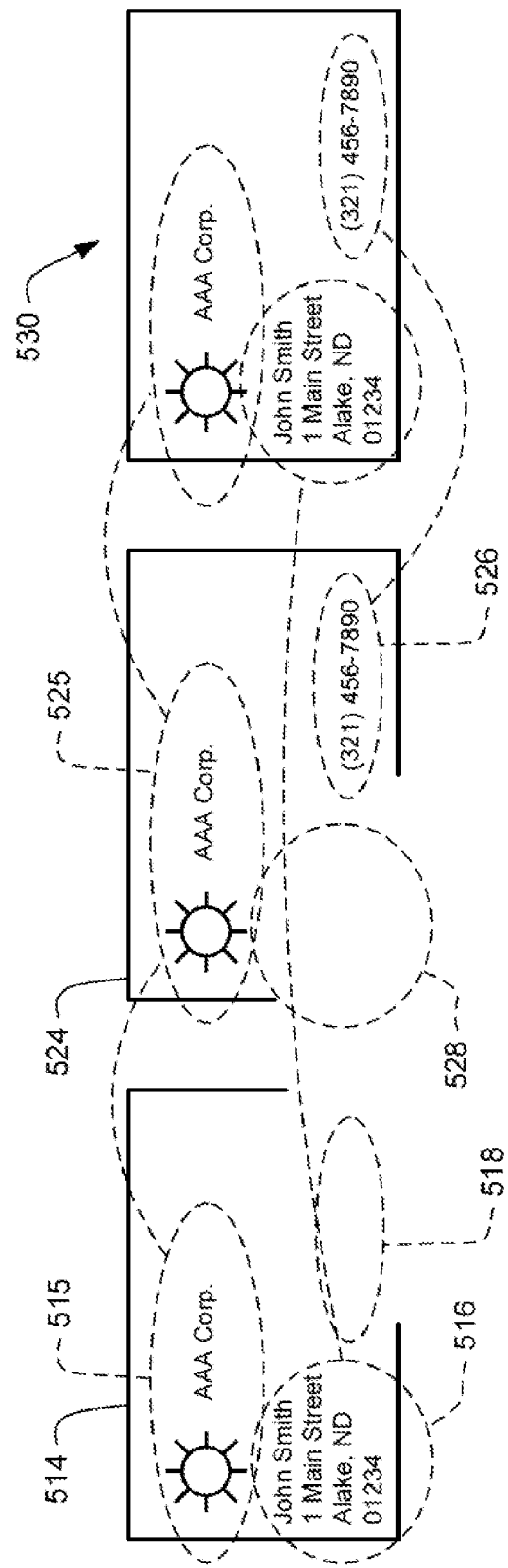
FIG. 5 diagrammatically illustrates an analysis of objects in the images of FIG. 4.

In the example shown in FIG. 4, frame 411 is an image captured by a camera at time t0 and frame 421 is an image captured by the same camera at time t1, where time t1 occurs after time t0. Portions of both images are unrecognizable due to glare 412 and 422. Accordingly and as shown in FIG. 5, the processor may detect objects 514-516 in image 411, and objects 524-526 in image 421.

The processor may determine that some of the objects are sufficiently visually similar to consider them a match. When considering whether objects are visually similar, the processor may compensate for potential differences that may arise because of conditions that are unrelated to the inherent visual appearance of an item in real space, such as different camera angles, camera distances, changes in brightness and the like.

In that regard, the processor may determine that various objects in the two frames match one another, such as company name/logo 515 and 525 and at least portions of edges 514 and 524. The processor may thus determine that company name and logo object 515 from image 411 and object 525 from image 412 match. Based on the location of object 516 relative to object 515, the processor may further determine the extent to which there is a matching object at location 528 relative to object 525. In the example of FIG. 5, the glare prevents the processor from recognizing any meaningful features at location 528. Similarly, the glare prevents the processor from recognizing any objects at location 516 that match feature 526. The processor may thus determine that something has prevented the camera from accurately capturing all of the features associated with one or more items, such as glare, brightness or camera settings.

If some objects in sequential images match, the processor may aggregate matching objects and nearby non-matching objects into a single collection of information. For example, the system and method may aggregate all of the objects into a single group 530 in spite of the fact that some of the objects came from different images. The single collection 530 may be used for different purposes, such as storing the aggregated information as a single contact in the device's list of contacts or keeping the information together for the purpose of searching.

Figure 6:
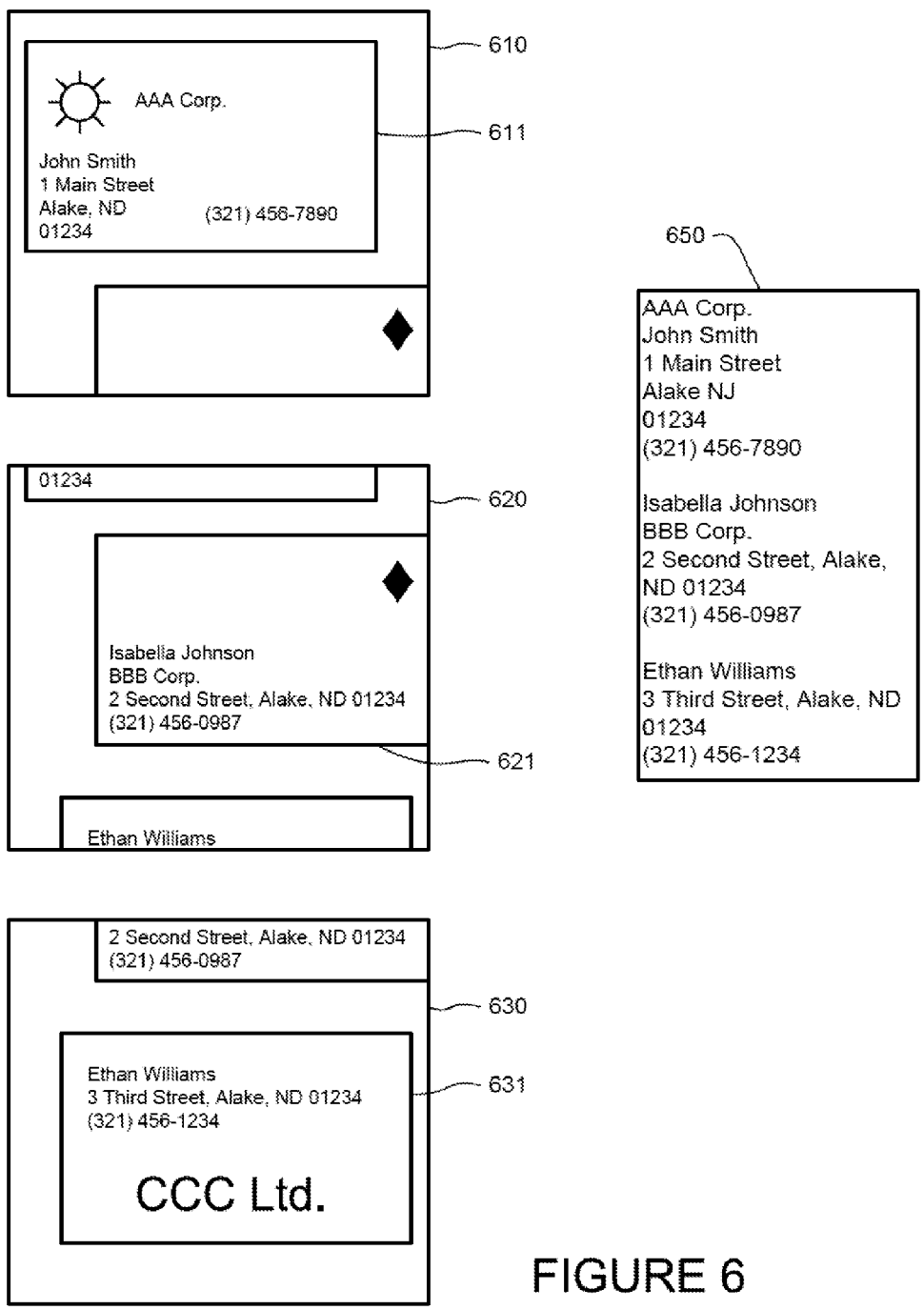
FIG. 6 illustrates sample images captured by a camera-enabled device and a collection of data determined as a result.

The system and method may also aggregate objects in different frames based on the types of the objects. By way of example, FIG. 6 illustrates three images 610, 620 and 630 where the three images were among the ten most recent frames captured by the camera. A processor may determine that all three frames have captured the image of a different business card 611, 621 or 631. Upon determining that all of the recent images have captured the same type of object such as a business card, the processor may further determine that the information from all of the frames should be aggregated.

For instance, if the frames were captured in rapid succession, and if different objects in the different frames appear to be the same type of object, then the processor may store the information as single collection. With reference to FIG. 6, the processor may conclude that the user is panning across business cards, perhaps because the user wants to record the names of everyone that attended a meeting. As a result, the processor may store the information obtained from the cards in a single text file 650, or as a single list pointing to the text of the individually stored cards. In that regard, the device may display a prompt to the user that asks whether the user would like to store the information—which was gathered at different times but determined to be related based on the type(s) of the objects—in a single document.

The system and method may also aggregate the information for the purpose of performing a search. For instance, instead of performing different queries based on the different objects found in different frames, the system and method may generate a single query containing all of the information obtained in connection with the related objects. By way of example, if the device performed a separate query for each frame shown in FIG. 6, the result may be three different lists, where each list relates to the individual biographical information of a different person. On the other hand, if the aggregated list 650 is sent as a single query, the highest ranked result may be an article that was co-authored by all three people.

The system and method may further use the frequency that an object appears in different images to identify the optimum object. FIG. 7 illustrates the example of a user pointing a camera-equipped cell phone at buildings 720-23, where frames 710-712 are the three most recent frames captured by the camera. As indicated by center axis 799, all three images have appeared in the center of a frame, which may make it difficult to determine the optimum object on that basis alone.

Figure 8:
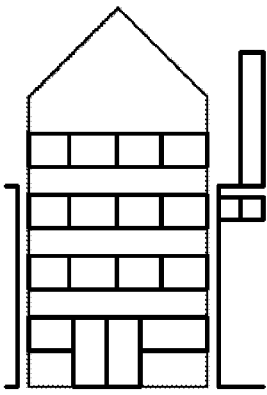
FIG. 8 diagrammatically illustrates objects and information determined as a result of analyzing the images of FIG. 7.

The processor may detect the objects in a frame and determine how often they visually match an object in another frame. FIG. 8 is a chart identifying the frequency of edge features shown in FIG. 7. The features 821 associated with building 721 appear the most frequently; the same features appear in all three frames. Features 820, 822 and 823 appear in less frames.

The processor may use such cross-frame frequency to affect the ranking of search results. By way of example only, features 821 appear three times as often in the image sequence as features 823. A result, when the processor searches for the optimum annotation, the processor may search for both features 821 and 823 but rank the results from feature 821 more highly than the results from feature 823.

Figure 9:
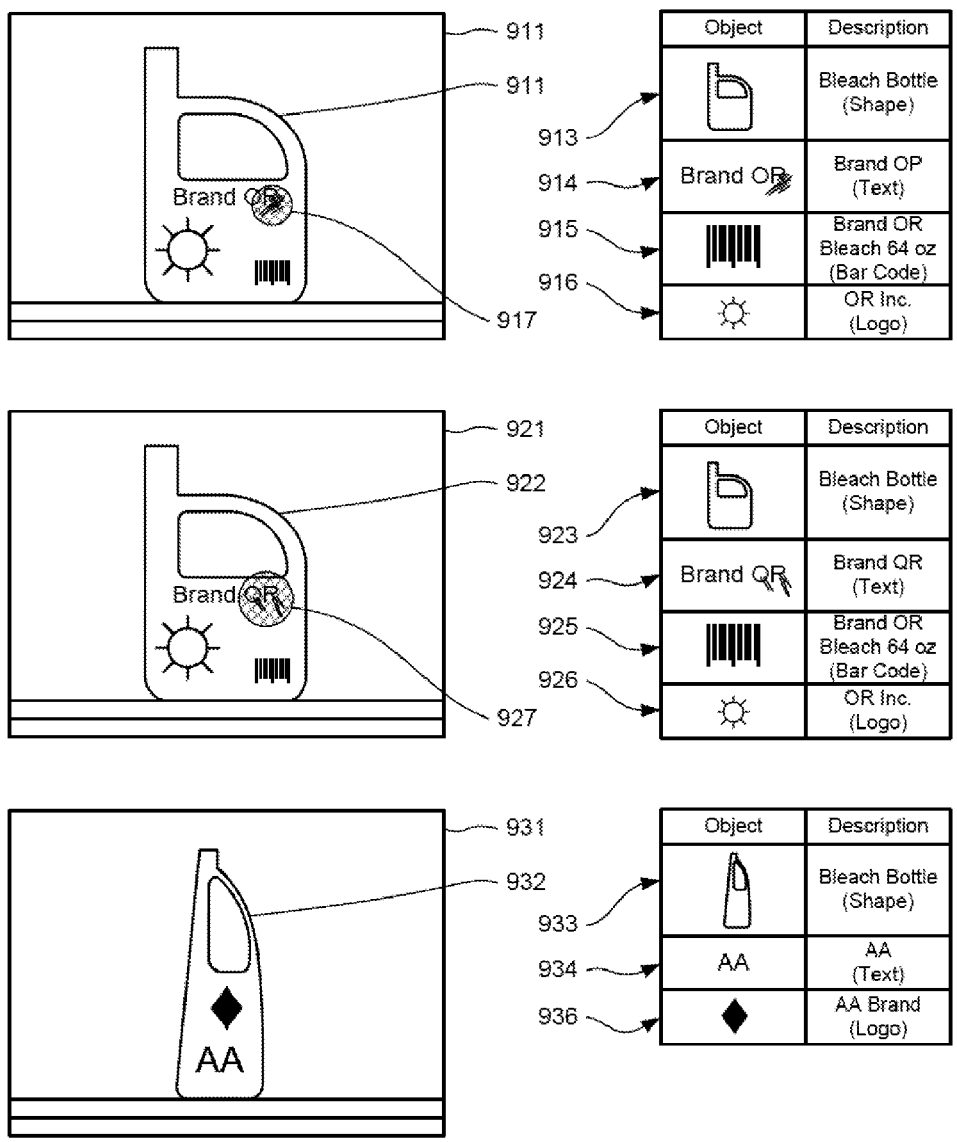
FIG. 9 illustrates sample images captured by a camera-enabled device, and objects and information determined as a result.

The frequency of descriptions of recognized objects may also be used to determine the optimum object and annotation. FIG. 9 illustrates three frames 911, 921 and 931 taken in sequence. In this example, the processor has detected and recognized a number of objects in frames 911, 921 and 931. Specifically, the processor detected features 913, 923 and 933, queried a database based on the features, and consequently recognized them as corresponding with the shape of a product. Similarly, the processor recognized features 914, 924 and 934 as corresponding with text, features 915 and 925 as corresponding with bar codes, and features 916, 926 and 936 as corresponding with a logo. The system and method may use a variety of processes to determine whether portions of an image match certain patterns or known shapes such as the required characteristics of a UPC barcode.

The processor next determines whether any of the information retrieved for the objects in one frame matches the information retrieved for objects in another frame. By way of example, the processor retrieved a few descriptions of the objects in frame 911 and those descriptions match the descriptions that were retrieved for the objects of frame 921. The matches include the shape described as a "Bleach Bottle," the product "Brand OR Bleach 63 oz" that was obtained from the value of the UPC label, and the company named "OR Inc." that was retrieved by searching for company logos matching the objects in the images. However, because of glare 917 and 927, the text strings extracted from the two images using OCR are different, namely "Brand OP" and "Brand QR". The frequency of the descriptions of the shape, bar code and logo objects thus exceeds the frequency of the description of the text object.

When the descriptions are used to query the search engine, the descriptions with the greatest frequency may be given more weight than descriptions with lesser frequency. In the absence of other signals, the search engine may rank results obtained by searching a signal with a high weight over the results obtained by searching a signal with a low weight. By way of example, the system and method may be structured such that a bar code is given a very high weight when searching for information about the objects in the image.

Figures 10, 11:
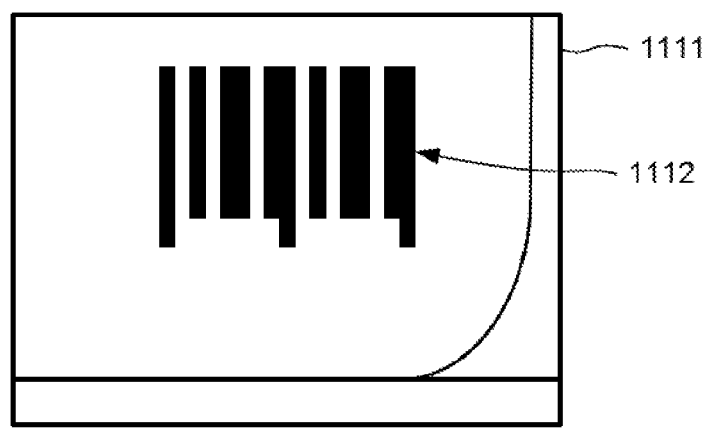
FIG. 10 illustrates information determined as a result of analyzing the images of FIG. 7.
FIG. 11 illustrates a sample image captured by a camera-enabled device.

If the system and method determines that the user appears to be interested in a broad category of objects rather than specific objects, the system and method may structure the query accordingly. By way of example, none of the objects detected in frame 931 visually match any of the objects detected in frames 911 and 921. However, the description of at least one of the objects detected in the last frame does match the description of objects detected in the other images, namely shape 933 is described as a "Bleach Bottle." Accordingly, when image 931 is combined with the other images to structure a query and as shown in FIG. 10, the most frequent description becomes the relatively broad category of "Bleach Bottle" instead of the much narrower category of "Brand OR Bleach 64 oz". The search term with the greatest weight thus becomes "Bleach Bottle", which might accurately indicate that the user is primarily interested in bleach bottles in general rather than any particular brand of bleach.

The weight of search signals determined from cross-frame analysis may also be balanced against the weight of search signals determined from single-frame analysis. Example frame 1111 of FIG. 11 was captured immediately after the example frames shown in FIG. 9. The server may accord great weight to the value of the bar code if the user has appeared to have zoomed in on a bar code. Thus, the search results that correspond with the bar code may be ranked much higher than the search results that correspond with the most frequent description of objects across many frames.

The system and method may also weigh information obtained from the most recent frames more heavily than information obtained from older frames. For instance, when preparing a query based on the frequency of descriptions across three of the most recent frames, the processor may give an object a relative weight of 1.00 if the object only appears in the most recent frame, a weight of 0.25 if the object only appears in the oldest frame, and a weight of 1.75 (equal to 1.00+0.50+0.25) if the object appears in all three frames. The system and method may determine and weigh other signals than those described herein.

The search for the optimum annotation may take place in stages. By way of example, a first search may be performed based on the visual features of the detected objects. If the characteristics are recognized, associated non-visually specific search terms, description may be used as such as the number of a bar code or the company name associated with a logo. The non-visually specific search terms may then be used to perform a second search that may or may not return visually-specific information. By way of example, if a search is performed based on the descriptions shown in FIG. 10, the search engine may return a ranked list of search results that includes alphanumeric information about the characteristics of the particular bleach product caught in the image such as price, images of different types of products sold under the same brand, audio signals such as a jingle used in commercials for the product, and URLs of websites containing reviews of the product.

A processor may select a subset of the returned results and display the selected subset to the user. This may include selecting the highest ranking result as the optimum annotation. The processor may also select results based on the type of the device. For example, if the image was captured by a device that is often used in a store such as a cell phone, the processor may select the result that provides standardized information about the optimum object such as the product's size and the average price charged for a product. The processor may also select as the optimum annotation the information that appears most applicable to the type of the recognized object, i.e., the address of a building if a building is recognized or a person's name if a person is recognized.

The frequency of search results may also be used to select the optimum annotation. For instance, a face may be recognized in two frames as being "John Smith" and in the next frame as "Bob Jones." If the face appears in the same location in each image, the processor may determine that it is unlikely that they are actually two different people and may thus use the name that appears the most often in the search results, i.e. "John Smith", as the optimum annotation.

If the search returns images, the images may be shown to the user as thumbnails that change as the captured images, queries and search results change.

The system and method may further determine whether different objects in the same or different frames are visual characteristics of the same item or different items. For instance, the processor may determine that visually similar objects in sequential frames are characteristics of the same item occupying the same location in the three-dimensional space of the captured scene, e.g., the same bottle of bleach, rather than different items, e.g., two different bottles of the same brand and size of bleach.

Figure 12:
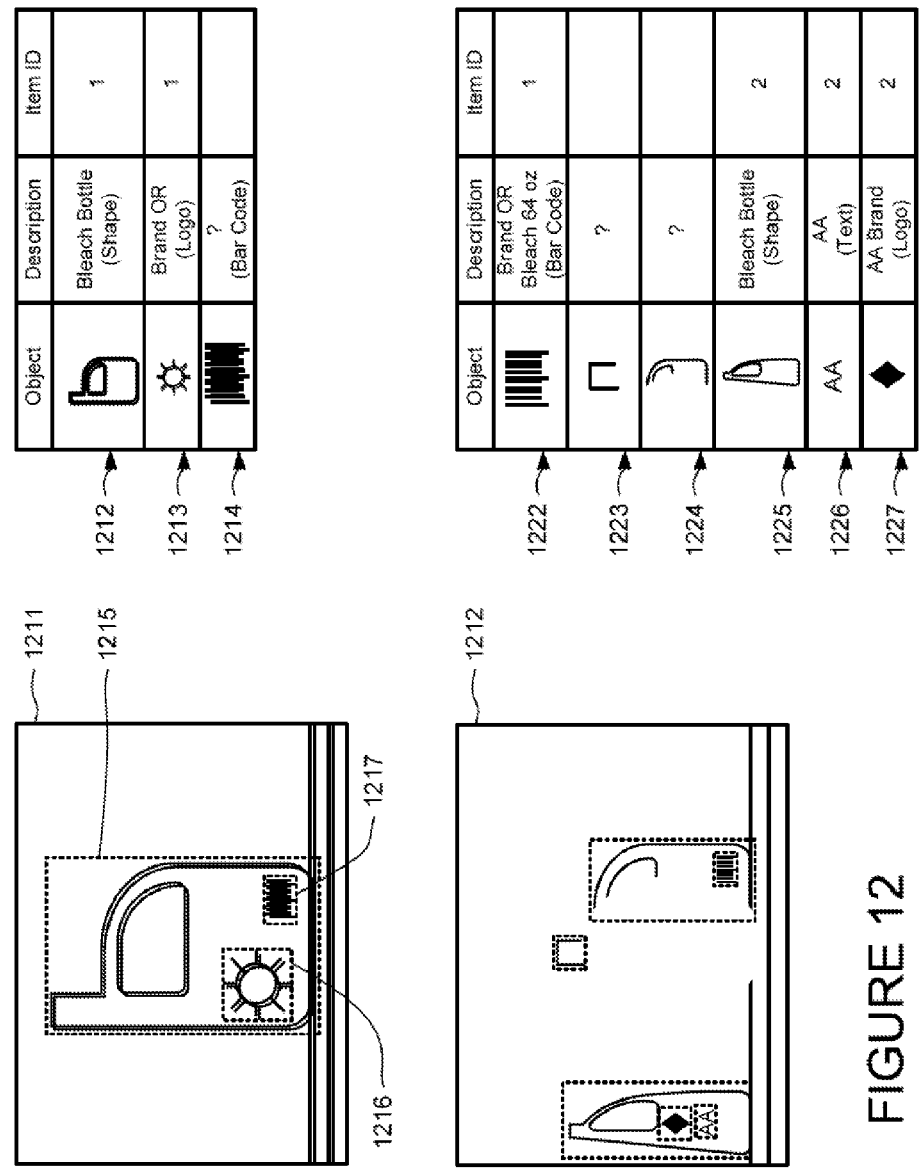
FIG. 12 illustrates sample images captured by a camera-enabled device, and objects and information determined as a result.
Figure 13:
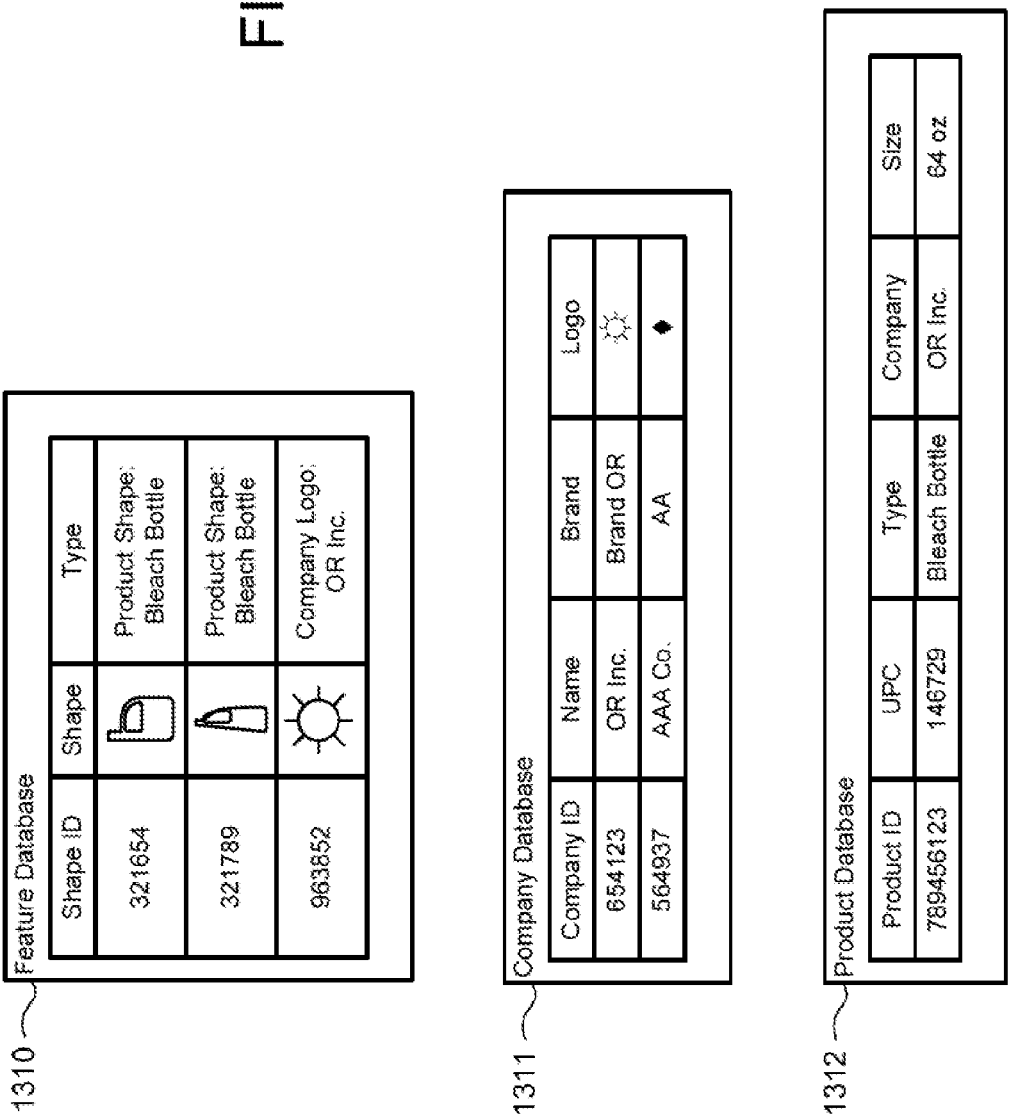
FIG. 13 illustrates sample records of databases that may be queried.

The system and method may further determine that visually dissimilar objects in the same image are associated with the same item. FIG. 12 illustrates the example of two frames 1211-12 taken in sequence. While the UPC label 1214 may be unreadable in frame 1211 because the image is out of focus, the processor may still be able to recognize other objects in the frame. By way of example, the processor may detect objects 1212 and 1213, query a database such as the feature database records 1310 shown in FIG. 13, and determine that objects 1212 and 1213 match the product shape of a bleach bottle and the logo of a company named "OR Inc." Other databases such as company database 1311 may also be queried. By querying the product database records 1312 based on the company name, the processor may further determine that the company sells a bleach bottle product. Accordingly, although objects 1212 and 1213 are visually dissimilar, the processor may determine that they are associated with the same item because of a relationship defined by information existing outside of the captured image data.

The processor may also use the location of different objects within an image to determine whether they represent different visual characteristics of the same item. By way of example, the processor may determine that bounding box 1215 of the recognized product shape 1212 completely encompasses the bounding box 1216 of the recognized logo 1213. As a result, the processor may conclude that the two objects are associated with the same item and the pixels within bounding box 1215 show a bottle of bleach sold by OR Inc.

An externally defined relationship may also be used to determine whether different frames have captured the same item. For instance, the processor may detect a number of objects 1222-27 in subsequent frame 1221. Because of glare, lack of access to necessary data or some other condition, the processor may lack sufficient information to recognize some of the objects. By way of example, the processor may fail to recognize bottle shape features 1223 and 1224 that are partially visually similar to objects in frame 1211. However, whereas the bar code in the prior frame was out of focus, the processor may now be able to recognize bar code 1222 in frame 1221. By querying product database 1312 of FIG. 13 based on the value of the bar code, the processor may determine that the bar code corresponds with a bleach bottle sold by OR Inc. As mentioned above, the processor used different objects in the previous frame 1211 to determine that the camera also captured a bleach bottle sold by OR Inc. As a result, the processor may determine that both frames have captured the same bottle of bleach.

Figure 15:
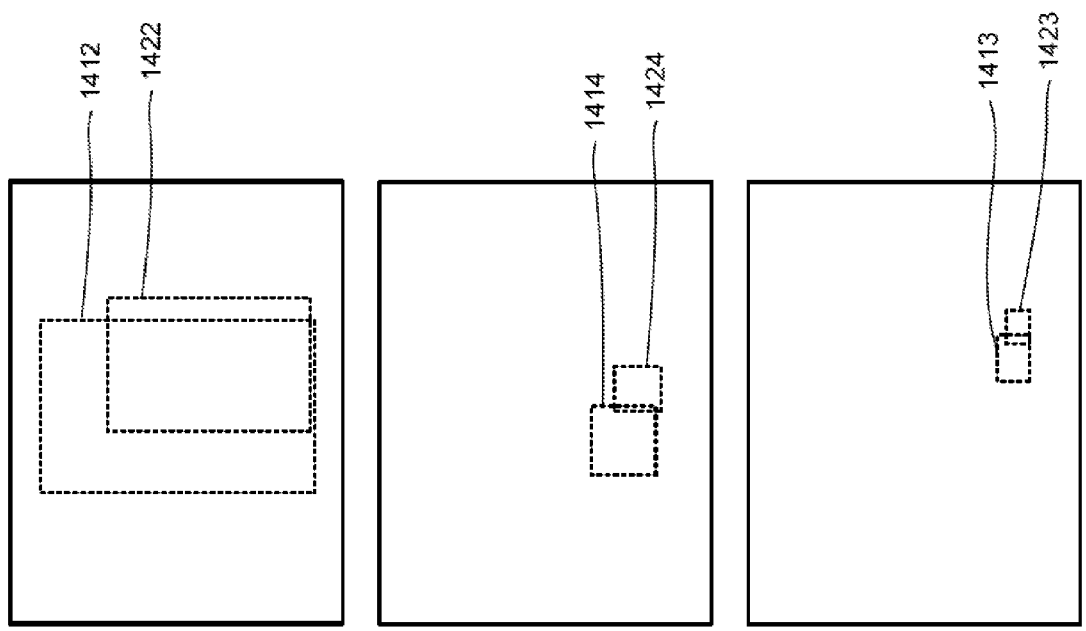
FIG. 15 compares the relative positions of bounding boxes determined during an analysis of the images of FIG. 14.

The system and method may further use the location of objects in different frames to determine whether the objects are the same or different items. FIG. 14 illustrates a sequence of frames 1411 and 1421. The processor detects three shapes in the first image, namely, the bottle shape, logo and bar code. The processor further determines a bounding box 1412-14 for each shape. In the next frame 1421, the processor detects additional objects and determines a bounding box 1422-24 for each. The processor may determine that the regions defined by three of the bounding boxes, namely bounding boxes 1422-24, contain objects that are visually similar to the prior frame. FIG. 15 superimposes the bounding boxes of the three pairs of visually similar objects of frames 1411 and 1421 relative to the edges of the frames. All of the regions defined by the bounding box overlap. Accordingly, the processor may determine that the objects are likely associated with the same item, i.e., the same bottle instead of two different bottles.

The bounding boxes may also be used to prune or change queries. For instance, if the processor detects a bar code in three different frames and the bounding boxes for the bar codes substantially overlap, the processor may assume that the camera was pointed at the same bar code even if the first two frames yielded a different bar code value, e.g. "12345789", than the third frame, e.g., "12345780". The processor may thus search only for the most popular bar code value, e.g., "12345789", because more images yielded that value in that location than the others. Alternatively, the processor may submit both of the values to the search engine but request that the search engine place more weight on the most popular value.

When the processor determines that different objects are likely associated with the same item, the processor may associate the objects with identifiers that are intended to track the item from frame to frame. As shown in FIG. 12, the processor may assign the arbitrary value of "1" to both shape 1212 and logo 1213 to indicate that the two objects are associated with the same item, e.g., they are different visual characteristics of the same bleach bottle. Because blurry bar code 1214 was not recognized, the system and method may be unable to determine whether that object is associated with Item #1 as well, or is instead associated with a completely different item that is positioned between the camera and Item #1. As a result, the processor may assign a different item number to object 1214 or, if the object is unrecognized, potentially not associate the object with any item. Having determined as explained above that the bar code 1222 of the next frame 1221 is also likely to be associated with the same item as objects 1212 and 1213, the processor may assign the same ID value of "1" to bar code 1222 as well. Using similar techniques to those described above, the processor may determine that objects 1225-27 are associated with a different item and assign a different item ID value to that object group.

By tracking those objects that are associated with the same item from frame to frame, or within a single frame, the system and method can avoid duplicative searches and apply greater or lesser weights to the information used during a search. For instance, as noted above, the fact that the same item appears in multiple frames may be an indication that the item is of interest to the user. Yet further, searching may be more efficient if an object is searched once for all of the frames in which the object appears instead of performing a separate search for the object after every frame. Thus, if a bottle of Brand OR Bleach appears in ten frames in a row, it may be more efficient to make a single query for the product and track its presence in the frames instead of making ten different queries and ranking an aggregated list of ten different results.

In another aspect, the system and method displays a visual indication of the optimum object and the indication moves on the display as the position of the object moves on the display. FIG. 16 illustrates how this may appear on a device. The figure shows four images that were captured in sequence at times t0-t4 by the camera of devices 1600. Once the object is determined, the processor may cause a bounding box 1620 to be displayed around the outer edges of the optimum object. As the user changes the position of the device, the location of the objects relative to the display 1610 also change as a result of panning, changing camera distance, zooming or the like. Accordingly, the processor may cause the location of the bounding box within the display to change as well. The system and method may also display—and move as the camera moves—multiple bounding boxes around other objects as well. The bounding box may further change appearance based on a variety of factors, such as whether the object is recognized or not recognized, the type of the object, or whether the bounded object is the optimum object. For instance, the bounding box may appear red for unrecognized objects and green for recognized objects.

Different visual indications may also be used. By way of example, FIG. 17 shows a word balloon 1720 that moves on the display as the object of interest moves on the display. The word balloon may display some of the information that was retrieved about the object from external sources of information, e.g., product name, company, size, UPC and a link to a website.

The location of the optimum object in the image may be provided by the server along with the annotation. Accordingly, the device may simultaneously display two or more of the following on the display of the device: (a) the image sent to the server, (b) an annotation that includes the additional information provided by the server, and (c) a visual indication within the image that is located on or proximate to the object for the purpose of identifying the object to which the additional information pertains.

The system and method may sequentially display the images and additional information at a speed that, from a human perception point of view, substantially corresponds with the scene being captured by the camera at the time of display. In other words, the system and method may be structured so as to minimize the lag between the capture of an image and the display of the annotated image. However, if the device wirelessly transmits the frames to a server for object detection and recognition, bandwidth and efficiency and other considerations may prevent one or more frames from being analyzed and returned to the mobile device before the frames should be displayed to the user.

Rather than determining the optimum object for every image to be displayed to the user, the system and method may determine the optimum object for a subset of the images. By way of example, device 1600 of FIG. 16 may only send and receive responsive information about the frames captured at times t0 and t3. Rather than displaying no information during times t1 and t2, the device may detect visual similarities between the two images to determine the location of the object of interest in the frame captured at time t1 and subsequently time t2 to display a bounding box in those intervening frames. As a result, the mobile device may visually identify the optimum object and annotation within a frame even if the frame was not analyzed for recognizable objects.

The system and method may determine the change in the objects' position from one image to another image by using a variety of image analytical techniques including but not limited to optical flow. For example, optical flow may be used to determine a vector representing the change in position of various points from one image to another, e.g., potentially each pixel.

The optical flow may be used in connection with the aforementioned feature detection. By way of example only, a Lucas-Kanade pyramidal optical flow method may be used to track feature correspondence between images. Coarse-to-fine tracking may be performed by iteratively adjusting the alignment of image patches around the points from image to image, starting with the smallest, coarsest pyramid level and ending with the finest pyramid level. The feature correspondences may be stored in a circular buffer for a certain period of time such as a number of seconds. This may allow the processor to replay the flow information in order to align features from an earlier image, which may be annotated, with their position within the latest image. An initial estimate of the point-wise delta may be computed by using the two frames to generate a full-frame transformation matrix that describes the translation and rotation that was likely applied to the device between the two frames. The resulting full-frame transformation, which is based on the images captured by the camera, may yield data similar to the data that was or would have been provided by a gyroscope measuring changes in position and orientation. The resulting point is where the original point would be located if it followed the overall transformation between frames. This may yield a starting delta which is generally closer to the actual delta for any given point, and thus will speed up the refinement process performed by optical flow by reducing the number of iterations required. Once objects are identified, they may have positions and scales tracked and updated from frame to frame, at a rate between 15 and 30 frames/second, according to the features that fall within or around a bounding box created for the object. By way of example, the processor may analyze some or all of the points around an area of interest, weigh them by distance to the center of the area, remove outliers and compute a weighted translation and scale based on the remaining points. Optical flow may be subject to drift in which case relocalization may be used and, if the relocalization fails, tracking of the object may be stopped until the object is reacquired.

The device may cease displaying a bounding box around a tracked object even if the device has determined that the object is contained in the then-current image. The device may take this action when the device determines that the user has likely lost or never had interest in the highlighted object. By way of example, the processor may automatically cease displaying the bounding box after a set amount of time, such as removing the bounding box if two seconds elapses without any indication that the user is interested in that object.

The mobile device may also cease displaying the bounding box when the object has very little visual similarity to the initial appearance when detected. For instance, tracking failures may result from drift, or the object may be removed from the visual field such as when something obstructs its view. Even if the device is not displaying the bounding box around a tracked object, the device may still continue to track the object for as long as the object appears.

The mobile device may also attempt to quickly reacquire the location of an object that temporarily disappears from the image sequence without the assistance of the server. For example, the processor may lose track of a soda can if another object momentarily passes in front of it, or if the camera has temporarily changed perspective. In that regard, the mobile device's processor may continue searching for objects that have disappeared from an image and identify the object when the object reappears, and such identification may occur before the mobile device receives information about the object from the server.

As noted above, various elements of the system and method can be split between the user's device and computers in communication with the device. For instance and in one aspect, the device may perform object detection and track the movement of objects from frame to frame and the server may perform object recognition only when the device requests it.

Based on the resources available to the device's processor, the device may also perform object detection, recognition or tracking of a subset of the object types that the server is capable of detecting, recognizing or tracking. The other objects in the images may be analyzed by the server. By way of example, the device may be capable of recognizing books and DVDs, which tend to follow somewhat consistent visual characteristics such as text being present on a rectangular spine or cover, without assistance of the server. However, such a device may also be unable to recognize company logos without communicating with the server.

The mobile device may also provide data that can be used to train the object detection and recognition capabilities of the server. For instance, a large portion of the data available to the server may initially permit the server to only recognize objects in relatively best case scenarios, i.e., a canonical position wherein the item is completely centered in the frame and facing directly towards the camera. If a mobile device starts tracking an item when the item appears in such a canonical position and continues tracking the item as the camera changes its perspective, the mobile device can provide the server with images of the item taken from many different viewpoints. The server may collect and aggregate similar data on the same type of item from other users. As a result and based on the tracking enabled by the mobile client, the server can amass a large quantity of images and other visual indicia that will help the server identify products from different perspectives that go beyond the perspectives initially used to identify an item.

The mobile device and server may also use a communication protocol whereby they asynchronously perform certain functions and exchange data upon the occurrence of certain events. For example, the mobile device may continuously send images to the server. Immediately upon receiving the image, the server may analyze the image data and identify all of the objects that will be used to search for annotations. However, the server may not actually perform the search until the server receives a request from the mobile device for the optimal annotation or a ranked list of annotations. Upon receiving a second image, the server may analyze the second image and determine whether the image would require a new search for annotations. If so, the server will perform a new search when the server receives a request for annotations associated with the second image. If not, the server will send the current search results to the mobile device when the server receives the request for annotations.

The sample values, types and configurations of data described herein and shown in the figures are for the purposes of illustration only. As these and other variations and combinations of the features discussed above can be utilized without departing from the systems and methods as defined by the claims, the foregoing description of exemplary embodiments should be taken by way of illustration rather than by way of limitation of the subject matter defined by the claims. The provision of examples, as well as clauses phrased as "such as," "e.g.", "including" and the like, should not be interpreted as limiting the claimed subject matter to the specific examples; rather, the examples are intended to illustrate only some of many possible aspects. Unless expressly stated to the contrary, every feature in a given embodiment, alternative or example may be used in any other embodiment, alternative or example herein.

The invention claimed is:

1. A computer-implemented method comprising:
obtaining a first image and a second image;
identifying a first set of one or more image features in the first image, and a second set of one or more image features in the second image;
obtaining a first description of the first image feature in the first image, and a second description of the second image feature in the second image;
determining that the first description of the first description of the first image feature in the first image matches the second description of the second image feature in the second image; and
generating a search query based at least on determining that the first description of the first description of the first image feature in the first image matches the second description of the second image feature in the second image.

2. The method of claim 1, wherein the first image feature and the second image feature are the same image feature.

3. The method of claim 1, wherein the first image feature and the second image feature are different image features.

4. The method of claim 1, wherein the first image feature comprises an object.

5. The method of claim 1, wherein obtaining a first description of the first image feature in the first image, and a second description of the second image feature in the second image comprises:

obtaining, from an index, a first text that describes the first image feature, and a second text that describes the second image feature.

6. The method of claim 5, wherein generating a search query based at least on determining that the first description of the first description of the first image feature in the first image matches the second description of the second image feature in the second image comprises:

incorporating at least a portion of the first text that describes the first image feature into the search query.

7. The method of claim 1, comprising incrementing a frequency count for the first description based on determining that the first description of the first description of the first image feature in the first image matches the second description of the second image feature in the second image, wherein the search query is generated further based on the frequency count.

8. A system comprising:

one or more computers and one or more storage devices storing instructions that are operable, when executed by the one or more computers, to cause the one or more computers to perform operations comprising:

obtaining a first image and a second image;

identifying a first set of one or more image features in the first image, and a second set of one or more image features in the second image;

obtaining a first description of the first image feature in the first image, and a second description of the second image feature in the second image;

determining that the first description of the first description of the first image feature in the first image matches the second description of the second image feature in the second image; and generating a search query based at least on determining that the first description of the first description of the first image feature in the first image matches the second description of the second image feature in the second image.

9. The system of claim 8, wherein the first image feature and the second image feature are the same image feature.

10. The system of claim 8, wherein the first image feature and the second image feature are different image features.

11. The system of claim 8, wherein the first image feature comprises an object.

12. The system of claim 8, wherein obtaining a first description of the first image feature in the first image, and a second description of the second image feature in the second image comprises:

obtaining, from an index, a first text that describes the first image feature, and a second text that describes the second image feature.

13. The system of claim 12, wherein generating a search query based at least on determining that the first description of the first description of the first image feature in the first image matches the second description of the second image feature in the second image comprises:

incorporating at least a portion of the first text that describes the first image feature into the search query.

14. The system of claim 8, the operations comprising incrementing a frequency count for the first description based on determining that the first description of the first description of the first image feature in the first image matches the second description of the second image feature in the second image, wherein the search query is generated further based on the frequency count.

15. A non-transitory computer-readable medium storing software comprising instructions executable by one or more computers which, upon such execution, cause the one or more computers to perform operations comprising:

obtaining a first image and a second image;

identifying a first set of one or more image features in the first image, and a second set of one or more image features in the second image;

obtaining a first description of the first image feature in the first image, and a second description of the second image feature in the second image;

determining that the first description of the first description of the first image feature in the first image matches the second description of the second image feature in the second image; and generating a search query based at least on determining that the first description of the first description of the first image feature in the first image matches the second description of the second image feature in the second image.

16. The medium of claim 15, wherein the first image feature and the second image feature are the same image feature.

17. The medium of claim 15, wherein the first image feature and the second image feature are different image features.

18. The medium of claim 15, wherein obtaining a first description of the first image feature in the first image, and a second description of the second image feature in the second image comprises:

obtaining, from an index, a first text that describes the first image feature, and a second text that describes the second image feature.

19. The medium of claim 18, wherein generating a search query based at least on determining that the first description of the first description of the first image feature in the first image matches the second description of the second image feature in the second image comprises:

incorporating at least a portion of the first text that describes the first image feature into the search query.

20. The medium of claim 15, the operations comprising incrementing a frequency count for the first description based on determining that the first description of the first description of the first image feature in the first image matches the second description of the second image feature in the second image, wherein the search query is generated further based on the frequency count.

* * * * *